April 1, 1947.　　C. A. ZAROBSKY　　2,418,387
MACHINE TOOL
Filed Nov. 22, 1943　　11 Sheets-Sheet 7
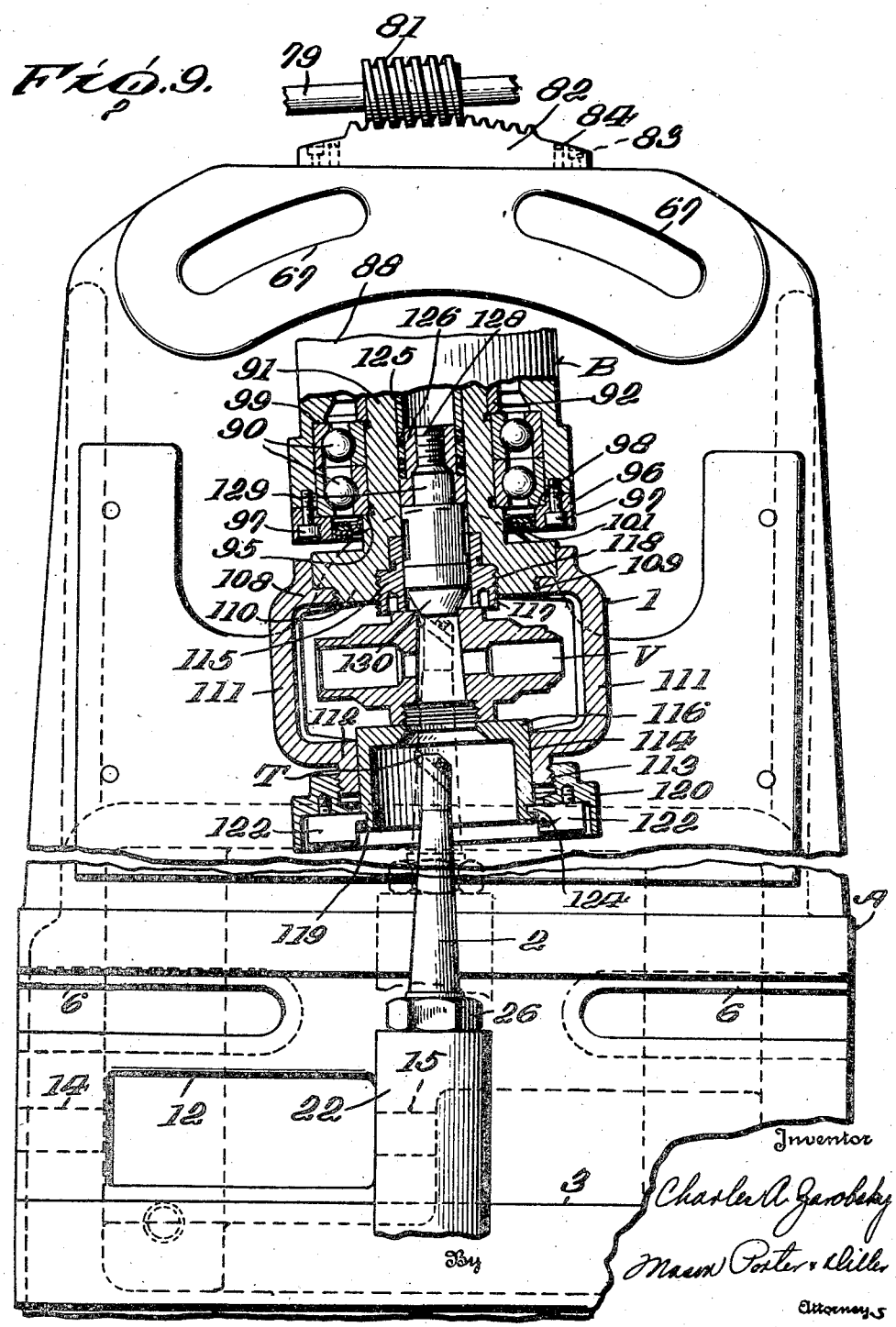

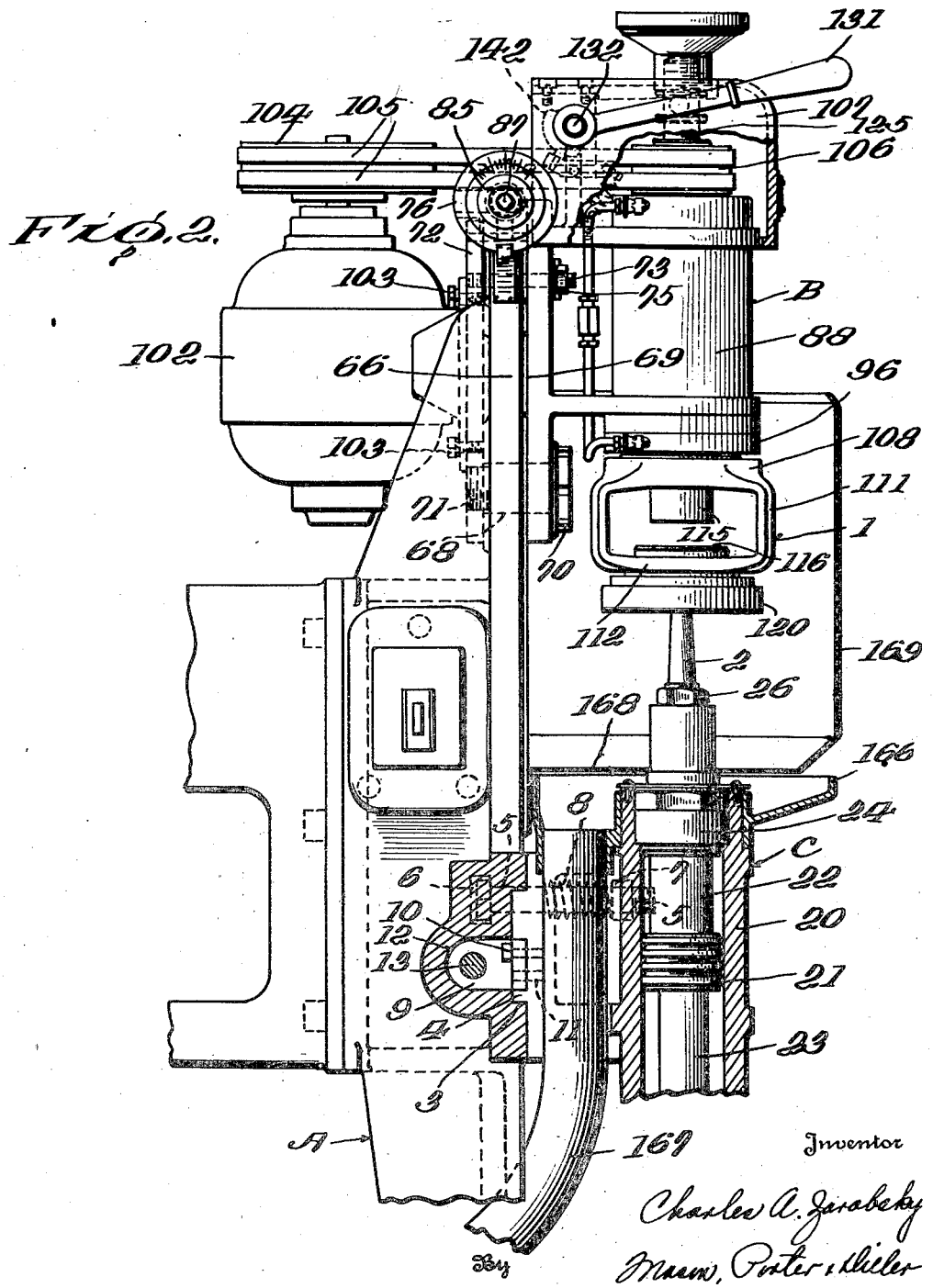

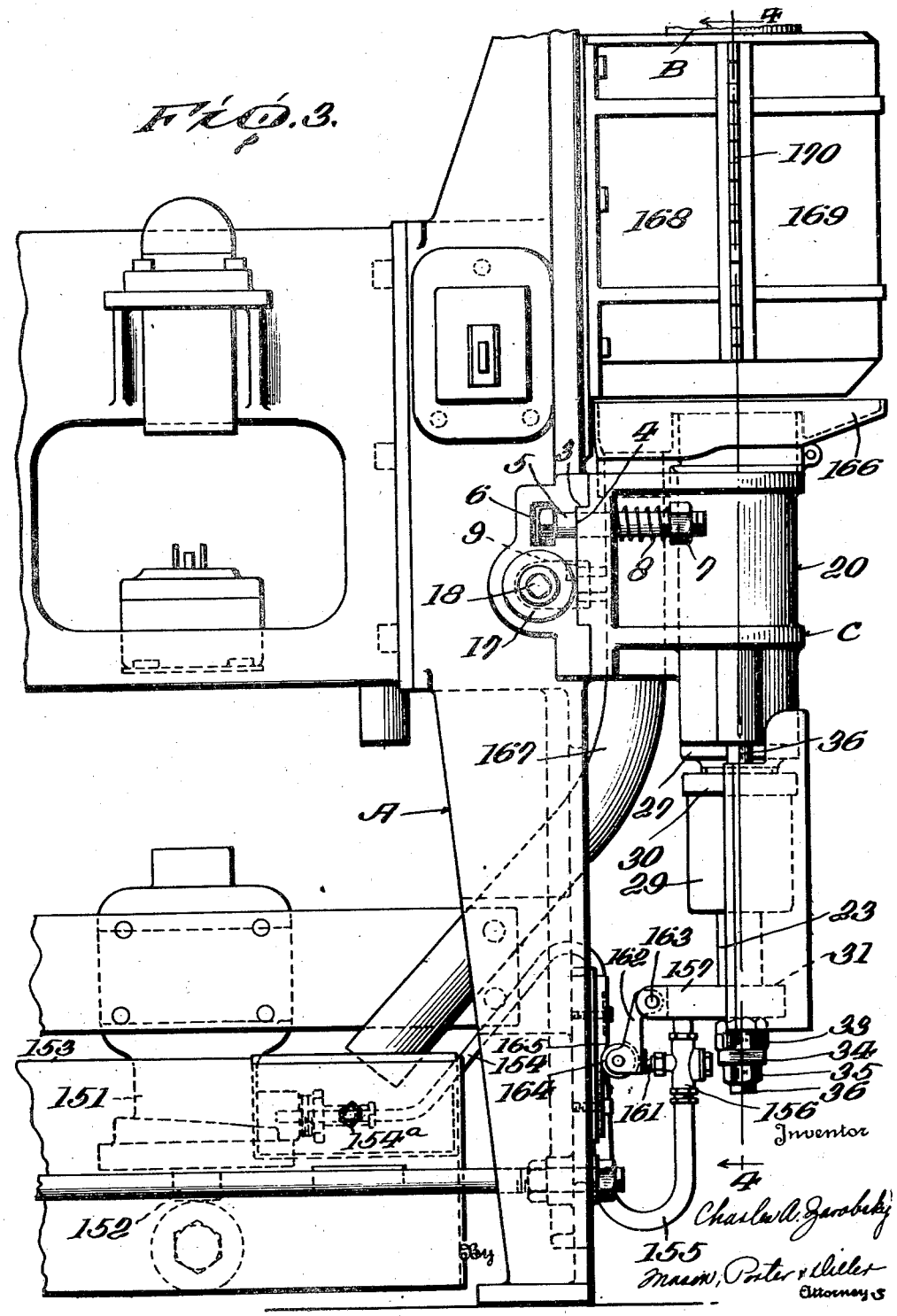

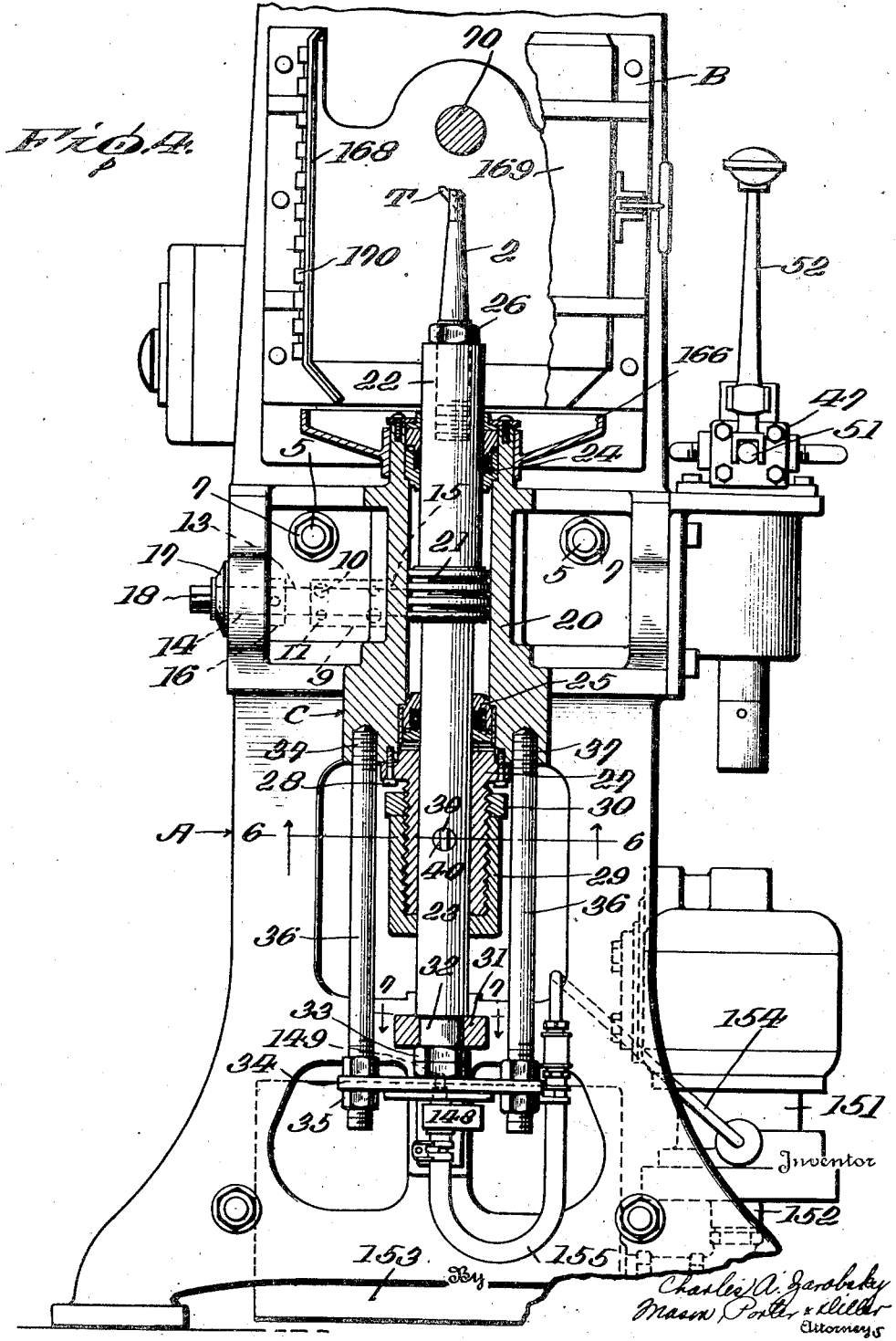

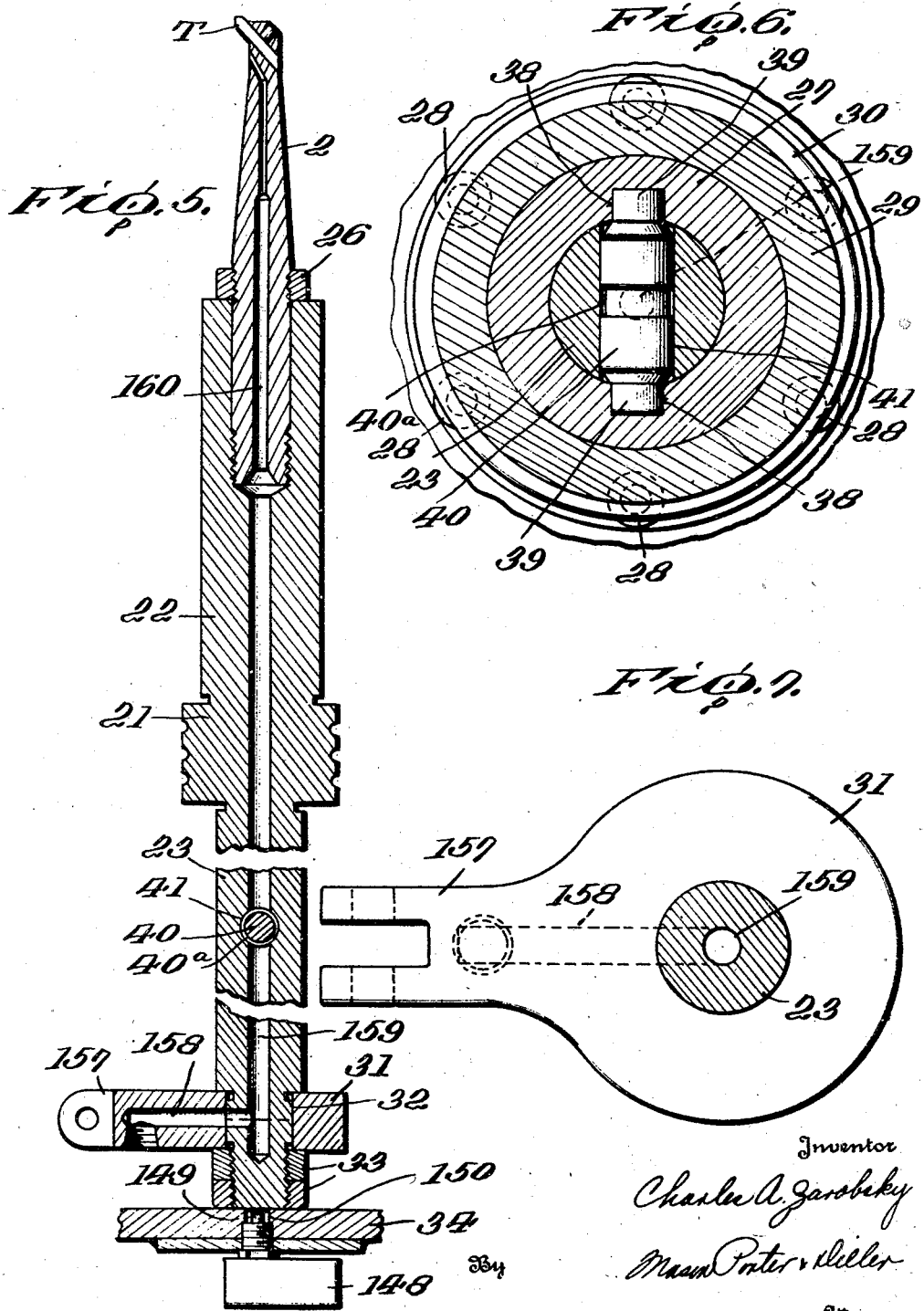

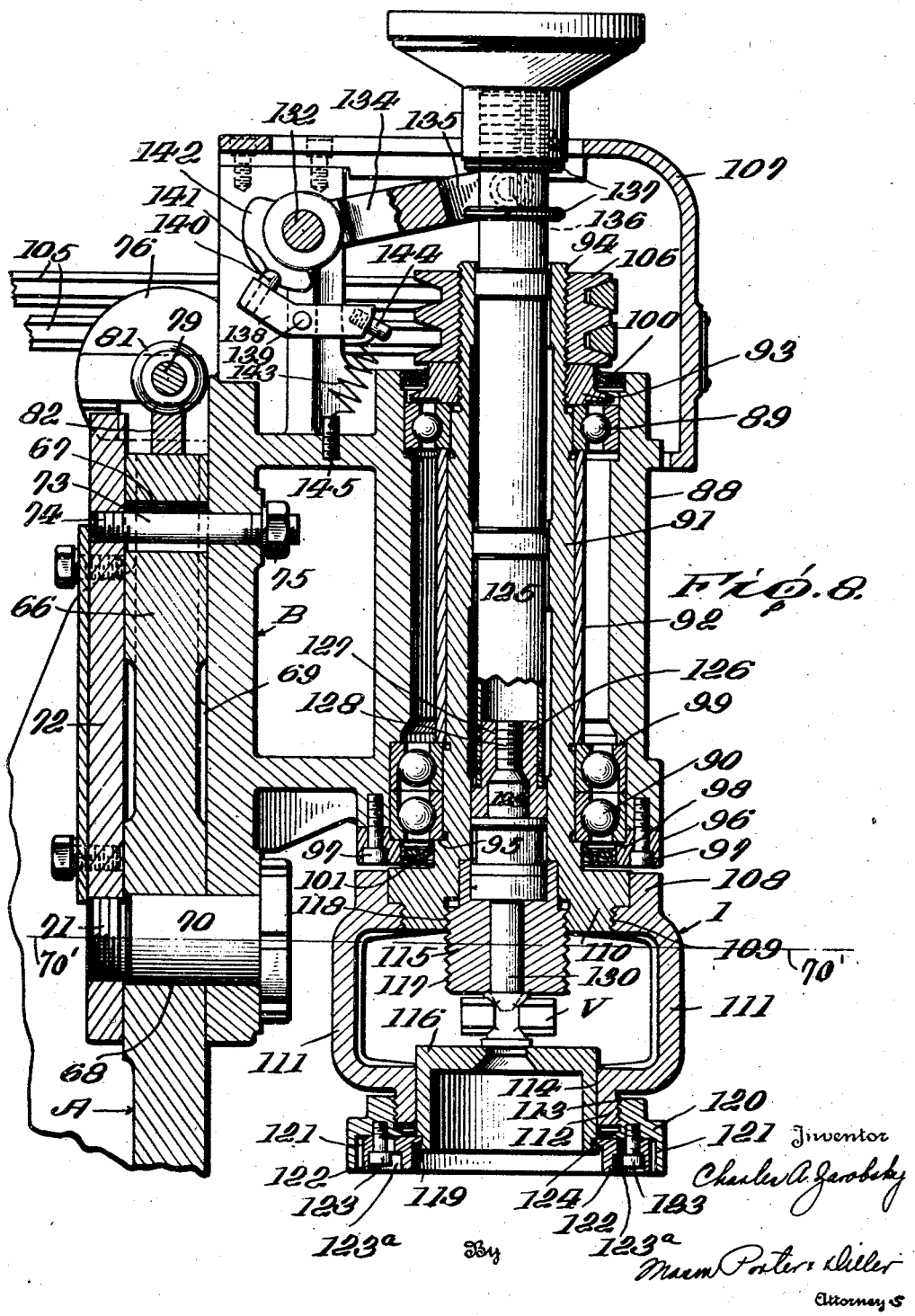

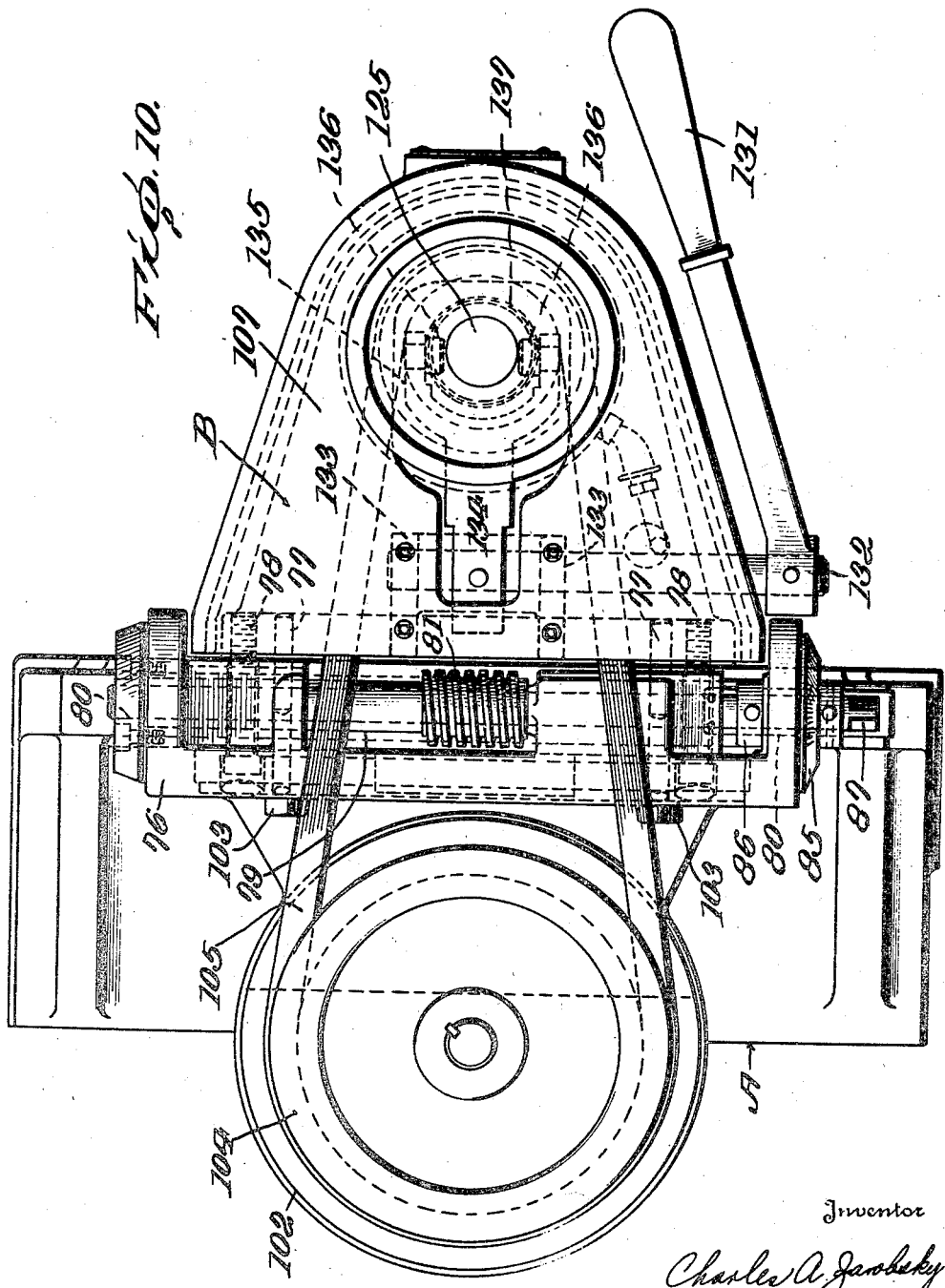

April 1, 1947. C. A. ZAROBSKY 2,418,387
MACHINE TOOL
Filed Nov. 22, 1943 11 Sheets-Sheet 9

Inventor
Charles A. Zarobsky
By Mason, Porter & Diller
Attorneys

April 1, 1947.  G. A. ZAROBSKY  2,418,387
MACHINE TOOL
Filed Nov. 22, 1943   11 Sheets—Sheet 10
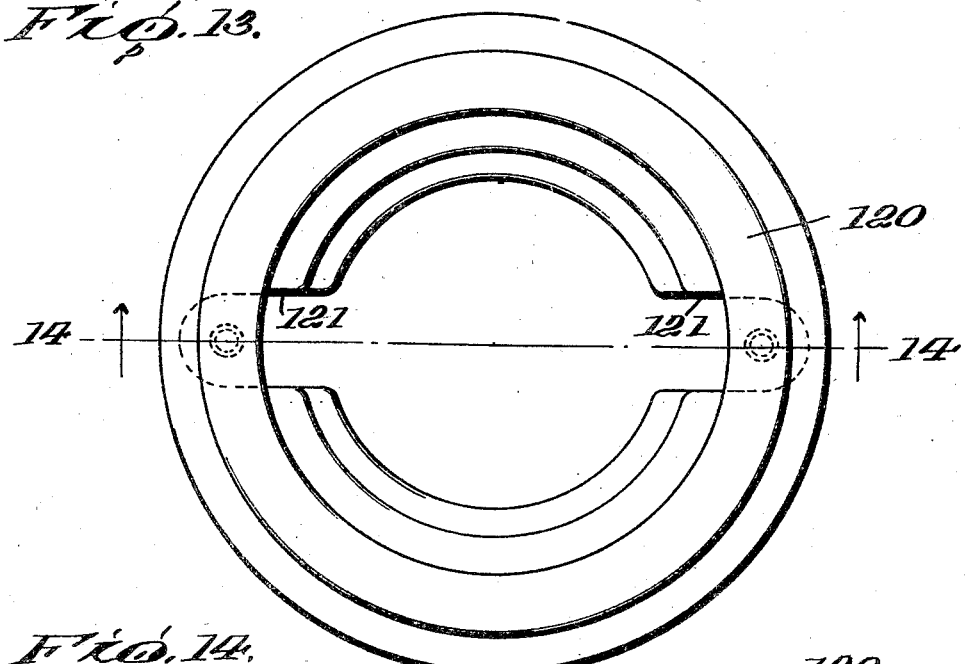
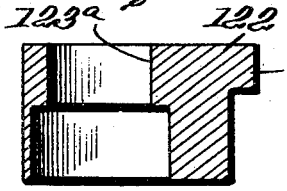
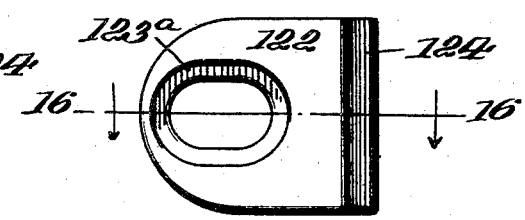
Inventor
Charles A. Zarobsky
By Mason, Porter & Diller
Attorneys April 1, 1947. C. A. ZAROBSKY 2,418,387
MACHINE TOOL
Filed Nov. 22, 1943 11 Sheets-Sheet 11
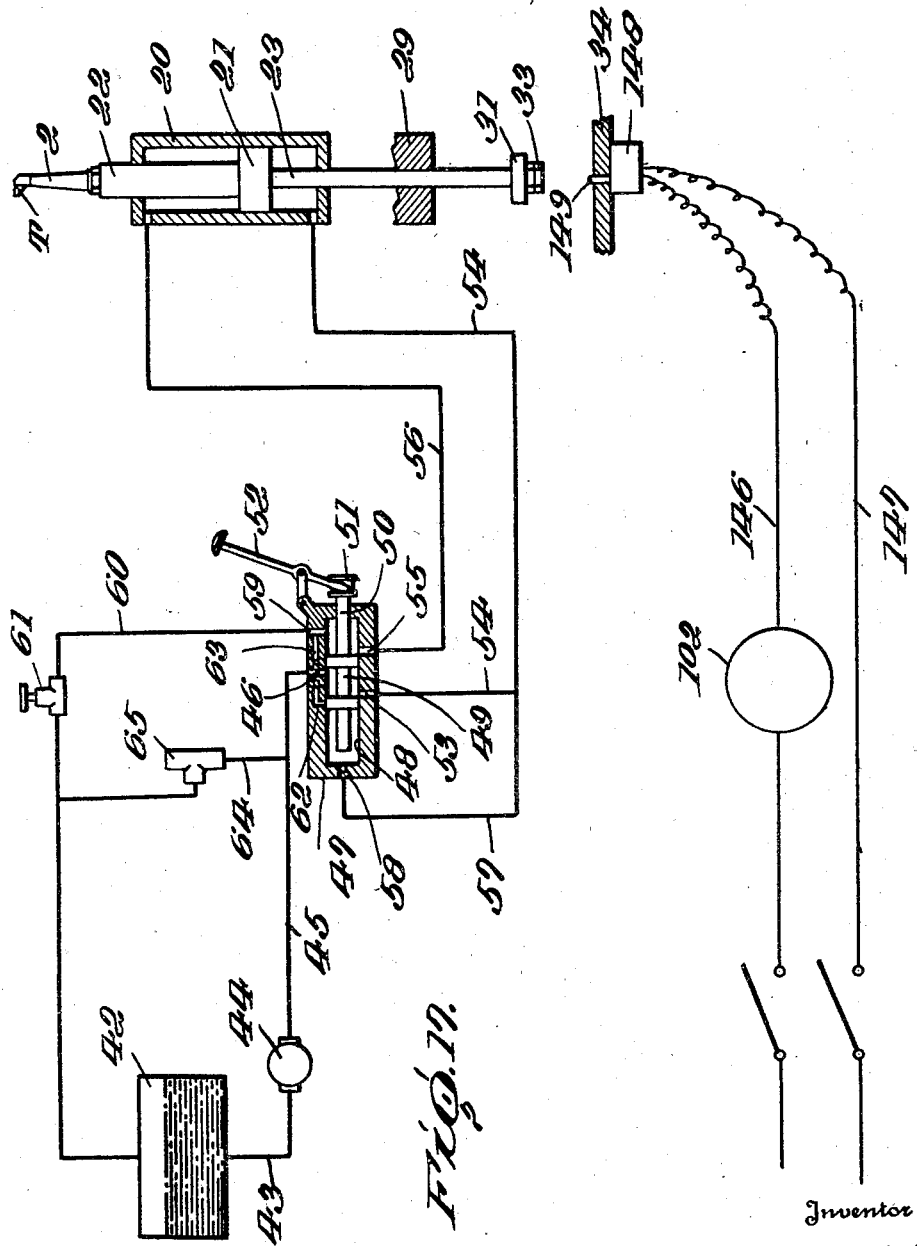

Patented Apr. 1, 1947

2,418,387

UNITED STATES PATENT OFFICE 2,418,387

MACHINE TOOL

Charles A. Zarobsky, Cleveland, Ohio, assignor to The Parker Appliance Company, Cleveland, Ohio, a corporation of Ohio Application November 22, 1943, Serial No. 511,338

4 Claims. (Cl. 77—4)

This invention relates to machine tools, and more particularly to machine tools for cutting or machining round surfaces, for example, the tapered bores of valve bodies.

An object of the invention is to provide a machine tool apparatus of the character referred to including new and improved mechanism for mounting and adjustably positioning a work holder and/or a tool holder in accordance with the size and contour of a surface to be machined.

Another object of the invention is to provide an improved work holder constructed or equipped to adapt it for holding work pieces of different kinds or sizes.

Another object of the invention is to provide a work holder which is arranged to facilitate the insertion of work pieces in and their removal from the work holder.

Another object of the invention is to provide improved mechanism for centering a work piece on the work holder.

Another object of the invention is to provide apparatus of the character stated with means for delivering coolant to the surface being machined, and improved means for controlling the flow of coolant.

Another object of the invention is to provide apparatus of the kind referred to including improved means for catching and returning used coolant to the coolant supply.

Another object of the invention is to provide a machine tool including a novel mechanism operable in response to return of a boring tool for cutting off the drive to a rotatable work piece holder.

A further object of the invention is to provide improved hydraulic mechanism for operating a reciprocable tool so as to effect automatically a relatively fast roughing cut and a relatively slow finishing cut.

Other objects will become apparent from a reading of the following detailed description, the appended claims, and the accompanying drawings.

In the drawings:

Figure 2 is an enlarged scale fragmentary elevational view of the upper portion of the machine shown in Figure 1, some parts being shown in vertical section.

Figure 3 is an enlarged scale side elevational view of the lower portion of the machine shown in Figure 1.

Figure 4 is a section on the line 4—4 of Figure 3 with some parts broken away and others omitted.

Figure 5 is an enlarged scale vertical section of a piston, piston rod, and tool holder assembly shown in operative relationship to a motor controlling switch.

Figure 6 is a horizontal section on the line 6—6 of Figure 4 drawn on an enlarged scale.

Figure 7 is a horizontal section on the line 7—7 of Figure 4 drawn on an enlarged scale.

Figure 8 is a vertical sectional view of a head carrying a rotatable spindle and a work holder, the head being shown as mounted for tilting movements on the machine frame.

Figure 9 is an enlarged scale view showing part of a work holder head in vertical section, the upper portion of the head being omitted to show the top of the machine frame and mechanism for tilting the head in elevation.

Figure 10 is a top plan view of the work holder head and mechanism for effecting tilting adjustment of the head.

Figure 13 is a plan view of a work holder clamping unit.

Figure 14 is a section on the line 14—14 of Figure 13.

Figure 15 is a plan view of a key.

Figure 16 is a section on the line 16—16 of Figure 15; and

Figure 17 is a diagram of a hydraulic circuit associated with a tool feeding hydraulic motor and an electrical circuit for controlling a work holder driving motor.

Figure 1:
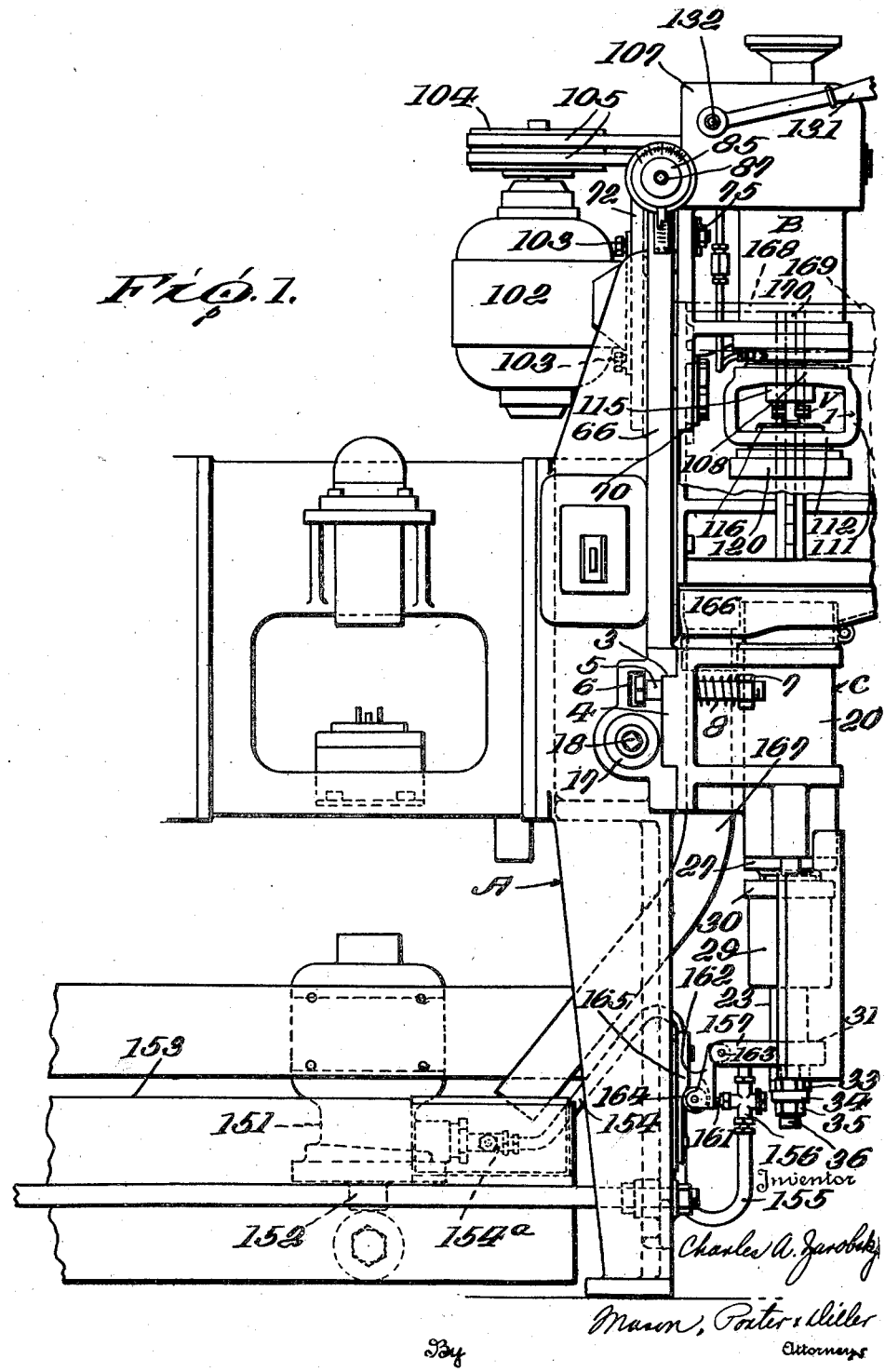
Figure 1 is a side elevational view of a machine embodying the invention with some parts broken away.
Figure 11:
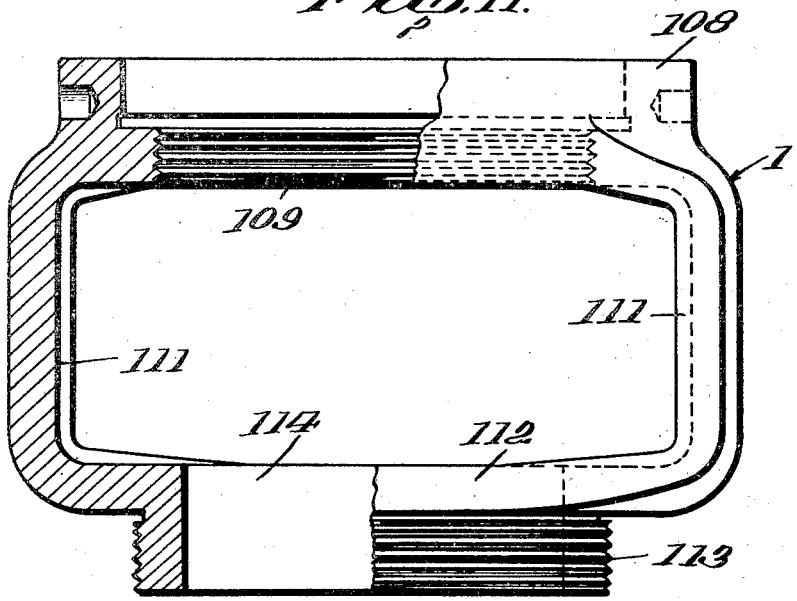
Figure 11 is an enlarged scale view of a work holder member shown partly in vertical section and partly in elevation.
Figure 12:
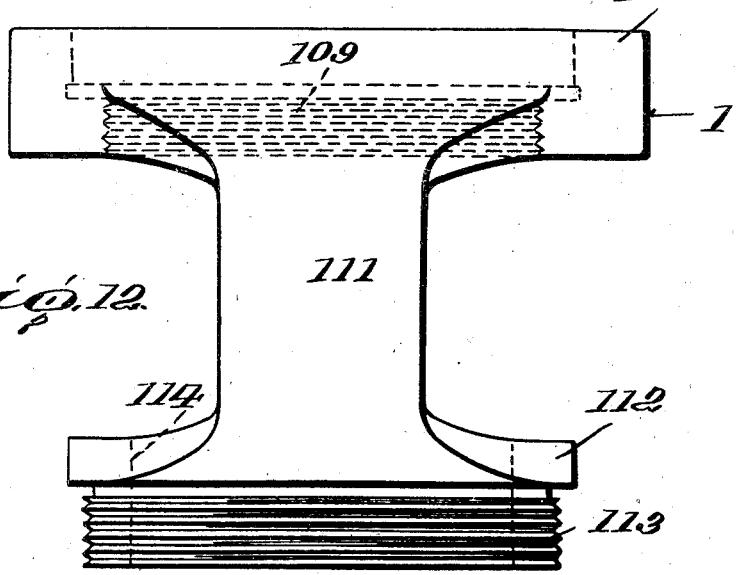
Figure 12 is a view in elevation at right angles to Figure 11.

Mechanism constructed in accordance with the invention is particularly adapted for machining round tapered parts, for example the tapered bores of valve bodies. In general, the illustrative embodiment shown in the accompanying drawings includes a frame A mounting a head B which carries a work holder 1 adapted to hold a work piece, specifically a valve body V. Also carried by the frame A is a head C on which is mounted a tool holding member 2 carrying a tool T. The work holder 1 is rotated so as to revolve the work piece V and the tool holder is mounted on the head C for feeding movement upwardly and then return movement downwardly with respect to the work piece holding member 1. In order to vary the mean diameter of the surface being machined, the head C is shifted horizontally in a straight line transversely to the direction of feeding of the member 1. For varying the degree or angle of taper of the machined surface, the head B is tilted on the frame A.

With more particular reference to the illustrative embodiment, the frame A is formed with a horizontally extending track 3 which receives for sliding movement a pad 4 formed on the lower head C. Bolts 5—5 having their head ends disposed in T-shaped slots 6 in the frame A extend through the pads 4 and are provided on their projecting ends with nuts 7. Springs 8 held against the head 6 by the nuts 7 press the head C against the frame with sufficient force to resist free horizontal sliding of the head, such force, however, being small enough to enable the head to be slid horizontally when shifting effort is applied.

A captive screw and traveling nut device is provided for shifting the head C. A block 9 located on and secured to the head pad 4 by screws 10 and pins 11 extends into a clearance space 12 in the frame A and is formed with a threaded bore which receives a screw shaft 13 journaled as at 14—15 on the frame A. Collars 16 and 17 secured to the shaft 13 on opposite sides of the bearing 14 hold the shaft against endwise movement. The shaft is formed with a squared end 18 adapted to receive a crank or the like by which the shaft may be rotated. When the shaft 13 is turned while being held against endwise movement, the block 9 and consequently the head C will be shifted along the track 3 so as to change the line of feeding of the tool holder 2 according to the mean diameter of the surface to be machined.

A hydraulic motor is carried on the head C for feeding the tool holder 2. Integral with the head C is a cylinder 20 in which is mounted a piston 21 equipped with upper and lower piston rods 22 and 23 extending respectively through packed glands 24 and 25. The piston rod 22 is formed at its upper end with a threaded bore for receiving the lower end of the tool holder 2 which may be held against being accidentally unscrewed by a lock nut 26.

The lower piston rod 23 extends through a sleeve 27 secured to the lower end of the cylinder by screws 28. The sleeve 27 is threaded externally to receive an adjustable stop nut 29 adapted to be held in adjusted position by a lock nut 30. A collar 31 held on a reduced portion 32 of the piston rod 23 by nuts 33 is engageable with the bottom of the stop nut 29 for limiting the upper feeding of the piston 21 and tool holder 2. The downward movement of the piston and tool holder is limited by engagement of the bottom end stop part of the piston rod 23 with a fixed cross bar stop part 34 secured by nuts 35 to the lower ends of two rods 36 having threaded connection as at 37 with the head C.

As shown in Figure 6 the sleeve 27 is formed with opposed longitudinally extending slots 38 which receive for sliding movement the ends 39 of a pin 40 mounted in a transverse opening 41 formed on the piston rod 23. Inasmuch as the sleeve 27 is fixed to the head C and cannot rotate, the slots 38 cooperate with the pin 40 to prevent rotation of the piston rods 23 and 22 and the tool holder 2.

The cylinder and piston motor 20—21 for feeding the tool holder 2 is connected in a hydraulic circuit shown diagrammatically in Figure 17. The arrangement is such that the piston and tool holder are moved upwardly at a fast rate to perform the roughing or main cut and are then moved downwardly at a slow speed to perform a light finishing cut. To provide for the desired difference in feeding rates, the piston rods 22 and 23 are made of different diameters so as to provide a differential fluid displacement above and below the piston 21 for a given amount of piston travel, and this differential displacement is utilized to vary the piston speed. Inasmuch as it is desirable that the tool holder 2 be supported strongly, the upper piston rod 22 is made of larger diameter than the lower piston rod 23, and the hydraulic circuit is so arranged that the larger effective piston displacement which occurs during a down stroke of the tool holder results in a slower downward travel.

Referring more particularly to the hydraulic circuit shown in Figure 17, a supply tank 42 is arranged to deliver working fluid through a conduit 43 to a pump 44 which discharges through a conduit 45 to the intake port 46 of a reversing valve casing 47. The casing 47 is formed with a bore 48 which receives for sliding movement a spool valve 49 having a stem 50 projecting beyond the casing and equipped with a double flanged collar 51. A lever 52 has its lower end disposed between the flanges of the collar 51 so that rocking of the lever will effect shifting of the spool valve 49.

A port 53 in the casing 47 leads through a conduit 54 to the lower end of the cylinder 20. A valve port 55 leads through a conduit 56 to the upper end of the cylinder 20. A branch conduit 57 leads from the conduit 54 to a valve passage 58 opening into the bore 48 at the left of the valve 49 as viewed in Figure 17. A valve exhaust port 59 communicates with a conduit 60 which leads through a throttle valve 61 back to the supply tank 42. An exhaust port 62 communicates with a passage 63 which leads to the port 50 and conduit 60. The passage 63 passes behind the port 46 as viewed in Figure 17 and does not communicate directly with the port 46. A by-pass relief conduit 64 controlled by a relief valve 65 is interposed between the conduits 45 and 60.

In operation, when the lever 52 and spool valve 49 are positioned as shown in Figure 17, fluid under pressure will flow from the pump 44 through the conduit 45, the port 46, the valve bore 48, the port 53 and the conduit 54 so as to pass into the lower end of the cylinder 20 and drive the piston 21 and tool holder 2 upwardly. During the up stroke of the piston 21 fluid contained in the cylinder 20 above the piston will be forced out through the conduit 56, the valve ports 55 and 59, the conduit 60, and the throttle valve 61 to be returned to the tank 42. Because of the large diameter of the piston rod 22 fluid will be exhausted from the upper end of the cylinder and will be forced past the throttle valve 61 at a relatively slow rate. The throttle valve restricts the return flow of the working fluid, having the effect of opposing the upward movement of the piston 21. However, since the displacement of fluid from above the piston is at a slow rate for a given amount of piston travel, the retarding of the upward piston travel by the throttle valve 61 is relatively small.

When the piston 21 and tool holder 2 have reached the limits of their upward travel as determined by engagement of the collar 31 with the stop nut 29, pressure will rise in the lower end of the cylinder 20 and in the conduit 54, the branch conduit 57, and the left hand end of the valve bore 48. The increased pressure acting on the left hand end of the valve 49 will shift the latter to the right. With the valve in its shifted position, fluid from the pump 44 will be delivered through the conduit 45, the valve ports 46 and 55, and the conduit 56 to the upper end of the cylinder 20 for driving the piston 21 and tool holder 2 downwardly. Fluid contained in the cylinder 20 below the piston 21 will be forced out through the conduit 54, the valve ports 53 and 62, the passage 63, the port 59, and the conduit 60 so as to flow through the throttle valve 61 and back into the tank 42. Because of the small diameter of the piston rod 23 with resultant relatively large cylinder volume below the piston 21, more fluid must be exhausted from the lower end of the cylinder 20 than had to be exhausted from the upper end of the cylinder when the piston was performing its upward stroke. Therefore, the restricting of return fluid flow by the throttle valve 61 has a greater tendency to retard the movement of the piston 21 during its down stroke than during its up stroke. Consequently the tool holder 2 will be fed upwardly at a relatively rapid rate and will feed downwardly at a relatively slow rate. This advantage is obtained together with the structural advantage of having the larger piston rod above the piston 21 so as to provide a stout support for the tool holder 2.

When the piston 21 reaches the limit of its downward travel as determined by engagement of the bottom of the rod 23 with the cross bar 34, pressure will build up in the conduits 56 and 45 until the relief valve 65 opens so as to permit fluid to be by-passed through the conduit 64 to the conduit 60 and thence to return to the tank 42.

In order to initiate another up stroke of the piston 21 and tool holder 2, the valve lever 52 is operated manually to return it and the valve 49 to the positions shown in Figure 17.

Referring now to the upper head B and the parts carried thereby for holding and rotating the work piece V, the frame A is formed with a mounting plate part 66 provided with spaced arcuate slots 67 curved on arcs having a frame opening 68 as a common center. A surface 69 of the head B is mounted against one face of the plate part 66 by means of a pintle or pin 70 extending through the frame opening 68 and having threaded engagement at 71 with a supporting plate 72 mounted against the opposite face of the plate part 66. Studs 73—73 having threaded anchorage at 74 in the supporting plate 72 span the plate 72 by extending respectively through the arcuate slots 67 and are equipped with nuts 75 which can be tightened to clamp the head B and supporting plate 72 against opposite sides of the frame plate part 66 respectively. When the nuts 75 are loosened, the head B and supporting plate 72 can be tilted as a unit about the pintle 70. Tightening of the nuts 75 serves to lock the head B in selected tilted position.

When the workholder 1 is centralized with its axis extending vertically the axis 70'—70' (see Figure 8) of tilting of the head B about the pintle 70 passes through or intersects the axis of rotation of the workholder at a point offset from the workpiece V along the workholder axis of rotation. Consequently, the tilting movement of the frame B required to adjust the workholder for machining different parts is small relative to the amount of tilting movement of the head B which would be required if the axis 70'—70' of the pintle 70 passed through the workpiece V.

Worm and sector mechanism is provided for tilting the head B to vary the degree or angle of taper being machined on the work piece V. A combined mechanism frame and housing 76 is secured to and held in properly located position on the head B by locator pins 77 and bolts 78. A shaft 79 journaled on the frame 76 at 80—80 is provided with a worm 81 meshing with a worm gear sector 82 secured to the top of the frame A and located thereon by means of screws 83 and pins 84. Collars 85 and 86 secured to the shaft 79 on opposite sides of one journal bearing 80 hold the shaft 79 against endwise movement in the frame 76. One end of the shaft 79 is squared as at 87 for receiving a crank.

In operation, tilting adjustment of the head B is effected by loosening the nuts 75 and rotating the shaft 79. Inasmuch as the sector 82 is stationary on the frame A, rotation of the shaft 79 and worm 81 causes the shaft 79 and consequently the head B to tilt together. The collar 85 may be calibrated to assist the operator in determining the degree of tilt which has been imparted to the head B by rotation of the shaft 79.

For mounting the work holder 1 for rotation, the head B is formed with a vertical sleeve 88 which supports bearing assemblies 89 and 90 journaling a hollow spindle 91. The inner race of the top bearing assembly 89 is clamped down against the top of a sleeve 92 by a nut 93 threaded on the upper portion 94 of the spindle 91. The lower end of the sleeve 92 presses against the inner races of the bottom bearing assembly 90 to hold the inner races against a shoulder 95 adjacent the bottom of the spindle 91. A ring 96 secured to the bottom of the head sleeve 88 by screws 97 is formed with a shoulder 98 abutting the lowermost outer race of the bottom bearing assembly 90, the upper outer race of the assembly 90 being thereby held in a race seat 99 formed in the stationary sleeve 88. A packing 100 is interposed between the sleeve 88 and the nut 93 at the top of the spindle 91, and a packing 101 is interposed between the stationary ring 96 and the lower end of the spindle 91.

Mechanism for rotating the spindle 91 and the work holder 1 includes a motor 102 secured to the supporting plate 72 by bolts 103. The motor pulley 104 drives belts 105 which pass around a pulley 106 threaded onto the upper end portion 94 of the spindle 91. Preferably the head B is formed with a cover portion 107 substantially enclosing the upper end of the spindle 91 and the pulley 106. When the head B is tilted in the manner previously described, the supporting plate 72 and motor 102 also will be tilted so that the position of the motor 102 with respect to the pulley 106 will remain unchanged and the belts 105 will remain properly aligned with respect to the pulleys 104 and 106.

The work holder 1 which is mounted on the lower end of the spindle 91 comprises an upper ring portion 108 threaded internally at 109 to engage a threaded flange 110 at the bottom of the spindle 91. Two ribs or arms 111 extend downwardly from the ring portion 108 and are spaced 180° apart. The lower ends of the arms 111 are integral with a lower ring part 112 threaded externally at 113 and formed with a bore 114.

The work holder 1 is provided with upper and lower adapter parts 115 and 116 between which the work piece V is clamped. The upper adapter 115 is threaded at 117 and screwed into an opening 118 in the bottom of the spindle 91. The lower adapter 116 is fitted in the bore 114 in the ring portion 112 of the work holder 1 and is formed with a peripheral groove 119.

A clamp nut 120 is threaded internally for engagement with the threaded part 113 of the work holder 1 and is formed with seats at 121 which receive keys 122 secured to the nut 120 by screws 123 extending through radial slots 123a in the keys. The keys 122 are formed with projections 124 which extend into the groove 119. When the screws 123 are loosened, the keys may be adjusted radially, as is permitted by the slots 123a.

When a work piece V is to be secured in the work holder 1, the piece V is inserted sidewise between the arms 111 and is centered with respect to the spindle axis in a manner to be described. Then the clamping nut 120 is drawn up tight so as to move the lower adapter 116 upwardly and clamp the work piece V between the adapters 115 and 116. By using adapters of different sizes, the work holder 1 may be conditioned for holding the work pieces of different sizes. Figure 8 shows adapters used when a relatively small work piece V is to be machined, and Figure 9 shows adapters used when a relatively large work piece is to be machined.

Means are provided for easily and quickly centering the work piece V with respect to the axis of the spindle 91. A locator or centering rod 125 is mounted for sliding movement in the hollow spindle 91. The rod 125 comprises a hollow tube fitted with a lower end member 126 formed with a threaded bore 127 adapted to receive the threaded stem 128 of a work piece locating or centering device 129 provided at its lower end with a tapered pin 130.

In operation, the centering rod 125 is lifted to raise the bottom of the pin 130 above the lower face of the upper adapter 115 and the work piece V is placed upon the lower adapter 116 with the bore of the work piece V roughly centered with respect to the axis of the spindle 91. The centering rod 125 is then lowered, causing the tapered lower end of the pin 130 to move into the preformed bore in the work piece V. The tapered lower end of the pin 130 will then automatically shift the work piece V so as to center its bore accurately with respect to the axis of the spindle 91. Then the clamping nut 120 is screwed up tight to clamp the work piece V between the adapters 116 and 115 and the centering rod 125 is raised clear of the bore in the work piece.

For operating the centering rod 125, a lever 131 is fast on a shaft 132 journaled on the head B as at 133—133. An arm 134 secured to the shaft 132 is formed with a forked end 135 carrying rollers 136 disposed between spaced flanges or collars 137 on the centering rod 125. By rocking the lever 131, the rod 125 can be raised or lowered at will. Detent mechanism for holding the rod in its raised position includes a detent lever 138 pivoted on the head B at 139 and equipped with a pin 140 adapted to be received in a depression 141 in a sector 142 carried by the shaft 132. A spring 143 interposed between a pin 144 on the lever 138 and a pin 145 anchored on the head B urges the lever 138 to rock so as to press the pin 140 into engagement with the sector 142. When the pin 140 is in the depression 141 the rod 125 will be held in raised position. When the rod 125 is in its lower position it will remain there by gravity until it is raised by the operator.

Means are provided for stopping the work piece holder driving motor 102 when the tool holder 2 is fully retracted and for starting the motor 102 when the tool begins to move upwardly on its rough cutting stroke. As shown diagrammatically in Figure 17, the motor 102 is connected in a circuit including conductors 146 and 147 leading to a switch 148 mounted on the cross bar 34 as shown in Figures 4 and 5. The switch 148 includes a push button operating member 149 which projects up through an opening 150 in the cross bar 34 directly under the piston rod 23.

When the piston rod 23 and the work holder 2 are in their lowermost positions as shown in Figures 4 and 5, the switch push button 149 is depressed and the circuit to the motor 102 is open so that the work holder 1 will not be driven. As soon as the piston rod 23 and work holder 1 move upwardly, the switch push button 149 will rise, thereby closing the switch 148 and completing the circuit to the motor 102 so as to drive the work holder 1.

Means are provided for directing a stream of coolant upon the surface being machined while the tool T is cutting and for automatically discontinuing the flow of coolant when the tool moves downwardly below the work piece V after the machining operation has been completed. A motor driven pump 151 has its intake 152 arranged to receive coolant from a reservoir 153. The pump 151 discharges through a relief valve 154a and discharge pipe 154 to a flexible tube or hose connection 155 which leads to a cut off valve 156 carried on a supporting arm 157 projecting from the collar 31 on the piston rod 23. As shown in Figure 5, the arm 157 is formed with a passage 158 communicating with a passage 159 extending longitudinally through the piston and rod unit 23—21—22. The passage 159 in turn communicates with a passage 160 in the tool holder 2, the upper arm of the passage 160 opening laterally through the tool holder 2 just below the tool T. In order to permit coolant to flow past the pin 40 which traverses the passage 159, the pin is formed with a circumferential groove 40a registering with the passage 159.

The cutoff valve 156 which controls the flow of coolant is opened automatically when the tool holder 2 moves the tool into cutting position and is closed automatically when the tool is moved below the work piece after the machining operation has been completed. A follower arm 162 pivoted as at 163 on the supporting arm 157 is equipped with a roller 164 which engages a cam 165 secured to the machine frame A. When the tool holder 2 is in its lower position as shown in Figures 1 and 3, the roller 164 is on the low part of the cam 165, permitting the arm 162 to be moved outwardly by the valve plunger 161 so as to close the valve 156. At this time coolant delivered by the pump 151 will be bypassed back to the reservoir 153 through the pressure responsive relief valve 154a. When the tool holder begins to rise, the roller 164 moves onto the high part of the cam 165, thereby rocking the arm 162 to press the valve plunger 161 and open the valve 156 so as to permit coolant to be delivered to the surface being machined.

Coolant and chips fall from the work piece V into a pan 166 supported on the cylinder 20 and thence return through a pipe 167 to the reservoir 153. Preferably the work holder 1 is enclosed by a housing 168 secured on the head B and equipped with a door 169 hinged as at 170 so as to be readily openable for inserting work pieces into and removing them from the work holder 1.

Operation

A complete operating cycle of the machine will be reviewed briefly. Before a work piece has been placed in the machine, the piston 21 and tool holder 2 will be in their lowermost positions with the lower end of the rod 23 holding the switch button 149 depressed so that the motor 102 and spindle 91 will not be running. The roller 164 will be on the low part of the cam 165 and the valve 156 will be closed so that no coolant will flow through the tool holder 2. Coolant delivered by the pump 151 will be by-passed through the valve 154a back to the reservoir 153. The valve 49 will be in a position to the right of that shown in Figure 17 so that fluid delivered under pressure by the pump 44 will be directed to the upper end of the cylinder 20, holding the piston 21 in its lowermost position while pressure fluid is by-passed through the valve 65 back to the tank 42. The centering rod 125 will be in its upper position.

To prepare for a machining operation, the clamping nut 120 is backed off and a work piece V is inserted between the adapters 115 and 116. The lever 131 is then depressed to lower the rod 125 and cause the tapered pin 130 to center the work piece V. The nut 120 is drawn up tight to clamp the work piece V, and the lever 131 then is raised to lift the centering rod 125 to move the pin 130 completely out of the work piece bore.

The shaft 79 is then turned to tilt the head B to a position depending upon the desired degree of taper to be formed in the work piece bore, and the shaft 13 is rotated to shift the head C according to the desired mean diameter to be formed in the work piece bore.

To start the machining operation the valve lever 52 is shifted to move the valve 49 to the position shown in Figure 17. Fluid under pressure will then be delivered to the bottom end of the cylinder 20 and the piston 21 will be moved upwardly at a relatively rapid rate to cause the tool T to perform the rough cutting operation. As soon as the piston rod 23 is raised enough to release the switch button 149, the switch 148 will close so as to start the motor 102, whereupon the spindle 91, the work holder 1, and the work piece V will be rotated. Before the tool T engages the work piece, the roller 164 will move onto the high part of the cam 165 thereby opening the valve 156 to cause coolant to be delivered to the surface to be machined.

After the roughing cut has been completed, the collar 31 carried by the piston rod 23 will engage the stop nut 29, arresting movement of the piston 21 and tool holder 2 and resulting in a building up of pressure in the conduits 54 and 57. The built up pressure acting on the left hand end of the valve 49 will shift the latter back to its starting position and pressure fluid will then be directed to the upper end of the cylinder 20 so as to drive the piston 21 and tool holder 2 downwardly at a relatively slow rate for causing the tool T to perform its finish cut.

When the piston rod 23 approaches its lowermost position, the roller 164 will move onto the low part of the cam 165, causing the coolant valve 156 to close. A slight further movement of the piston rod will bring it into engagement with the switch push button 149 to open the switch 148 and stop the motor 102. The parts will then come to rest in their starting positions and the machined work piece V can be removed by backing off the clamping nut 120.

The mechanism disclosed herein embodies the invention in the form now preferred, but it will be apparent that changes may be made without departing from the invention as defined in the claims.

I claim:

1. In apparatus for machining tapered parts, a frame having a mounting plate; a first head mounted to shift linearly across one face of said mounting plate; a threaded shaft journalled in said frame; a part on said first head having threaded engagement with said shaft for shifting said head when the shaft is rotated; a second head adjacent said one face of said mounting plate; a support adjacent the opposite face of said mounting plate; a pivot opening in said mounting plate; a pintle extending through said opening and into said head and said support; connecting means spanning said plate and being anchored respectively in said second head and said support and cooperating with said pintle to mount said second head and said support for tilting as a unit about said pintle on said plate; a work holder rotatably mounted on said second head; a motor mounted on said support; driving connections between said motor and said work holder; a tool holder; and means mounting said tool holder on said first head for movement transversely to the direction of linear shifting of said first head.

2. In apparatus for machining tapered bores, a frame having a mounting plate; a head mounted against one face of said plate; a support adjacent the opposite face of said plate; a pintle extending through said plate and being connected to said head and said support for mounting said head and said support pivotally on said plate; arcuate slots in said plate spaced from and concentric with respect to said pintle as a center; connecting bolts extending through said slots respectively and being anchored at their opposite ends to said support and said head respectively for cooperating with said pintle to maintain said head and said support assembled and tiltable as a unit about said pintle; a work holder rotatably mounted on said head; a motor mounted on said support; driving connections between said motor and said work holder; means for mounting a tool holder on said frame; and means for feeding the tool holder toward and from the work holder.

3. In apparatus for machining tapered parts, a frame having a mounting plate; a first head mounted to shift linearly across one face of said mounting plate; a threaded shaft journaled in said frame; a part on said first head having threaded engagement with said shaft for shifting said head when the shaft is rotated; a second head adjacent said one face of said mounting plate; a support adjacent the opposite face of said mounting plate; a pivot opening in said mounting plate; a pintle extending through said opening and into said head and said support; connecting means spanning said plate and being anchored respectively in said second head and said support and cooperating with said pintle to mount said second head and said support for tilting as a unit about said pintle on said plate; means for tilting said second head on said mounting plate comprising a worm element and a worm wheel sector element, one of said elements being mounted on said mounting plate and the other of said elements being mounted on said second head;

a work holder rotatably mounted on said second head; a motor mounted on said support; driving connections between said motor and said work holder; a tool holder; and means mounting said tool holder on said first head for movement transversely to the direction of linear shifting of said first head.

4. In apparatus for machining parts, a frame; a first head mounted for linear shifting on said frame; a tool holder mounted on said first head to be fed transversely to the direction of shifting thereof; a second head; a work holder rotatably mounted on said second head; and means mounting said second head on said frame to tilt about an axis which, when said work holder is centralized, passes through the axis of rotation of said work holder at a point offset along the work holder axis from a work piece held in said work holder.

CHARLES A. ZAROBSKY.

REFERENCES CITED

The following references are of record in the file of this patent:

UNITED STATES PATENTS

| Number | Name | Date |
|---|---|---|
| 408,259 | Pentz | Aug. 6, 1889 |
| 1,233,994 | Dow | July 17, 1917 |
| 1,989,227 | Craley | Jan. 29, 1935 |
| 528,557 | Peabody | Nov. 6, 1894 |
| 2,343,164 | Woszczyna | Feb. 29, 1944 |
| 1,398,338 | Mirrieless | Nov. 29, 1921 |
| 1,861,497 | Hallenbeck | June 7, 1932 |
| 1,911,132 | Macomber | May 23, 1933 |
| 1,990,052 | Sosa | Feb. 5, 1935 |

FOREIGN PATENTS

| Number | Country | Date |
|---|---|---|
| 237,070 | British | July 23, 1925 |
| 85,714 | German | Mar. 12, 1896 |
| 198,717 | British | June 14, 1923 |
| 258,524 | German | Apr. 9, 1913 |